March 9, 1937. T. C. PROUTY 2,073,267
VEHICLE SPRING SUSPENSION DEVICE
Original Filed Oct. 26, 1931 4 Sheets-Sheet 3
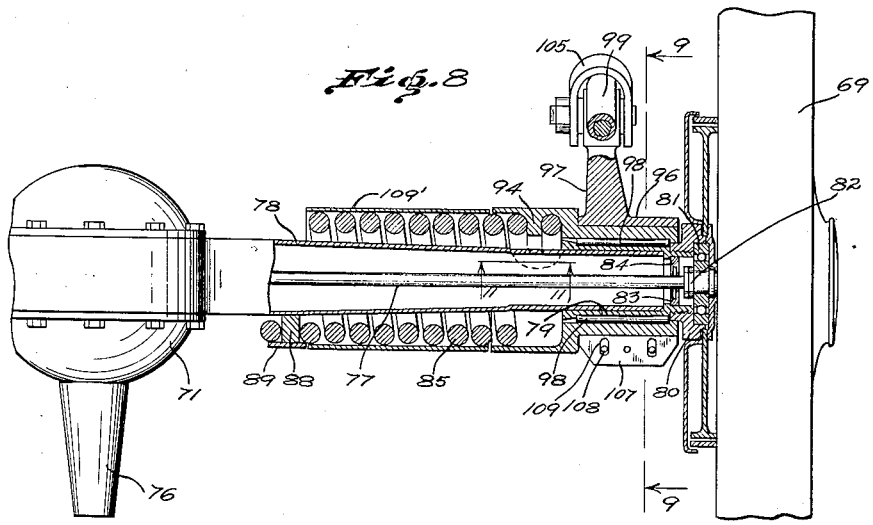
INVENTOR
THEODORE C. PROUTY, DEC'D.
BY WILLIS O. PROUTY, ADMR.
by John Flam
Attorney March 9, 1937. T. C. PROUTY 2,073,267
VEHICLE SPRING SUSPENSION DEVICE
Original Filed Oct. 26, 1931 4 Sheets-Sheet 4

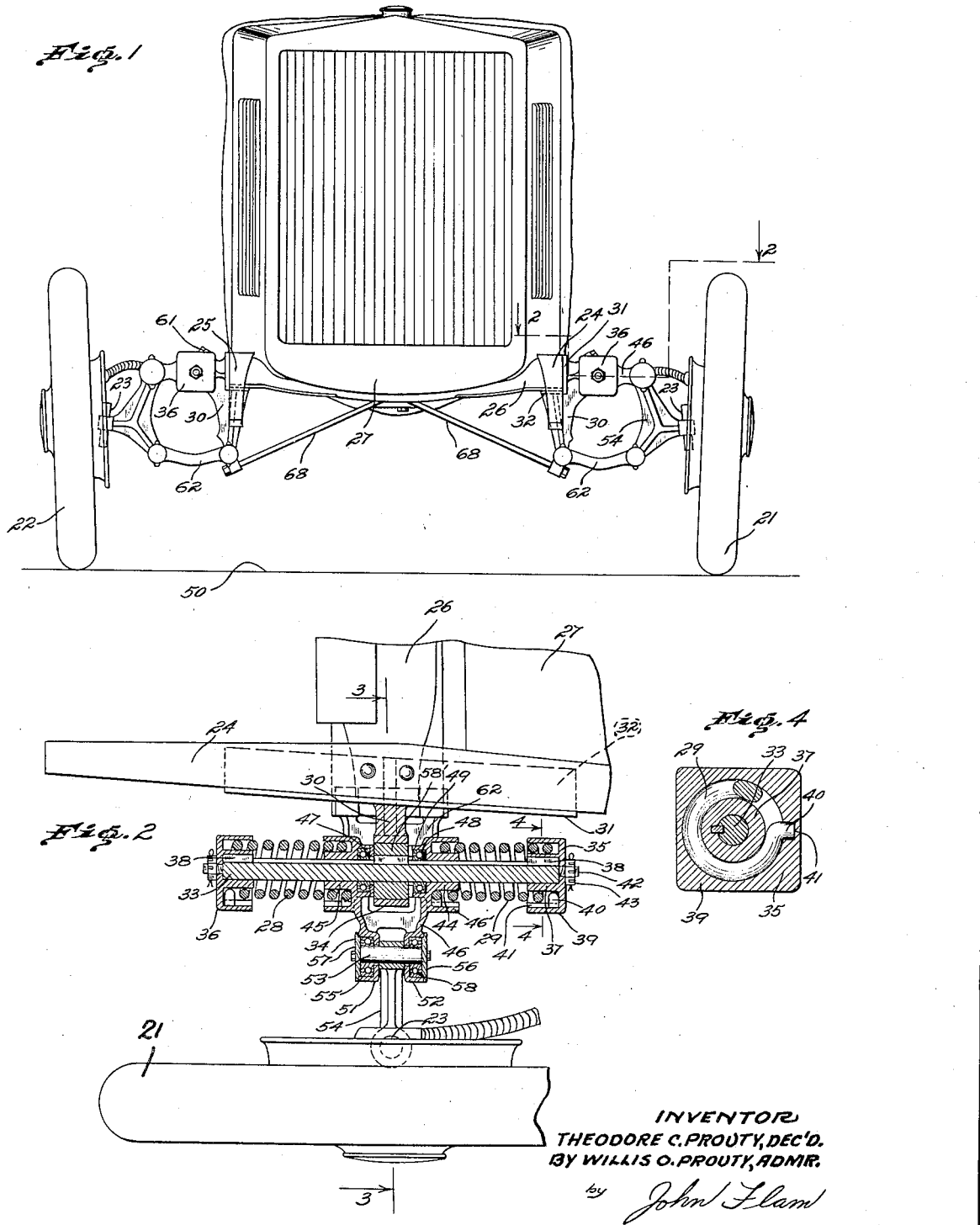

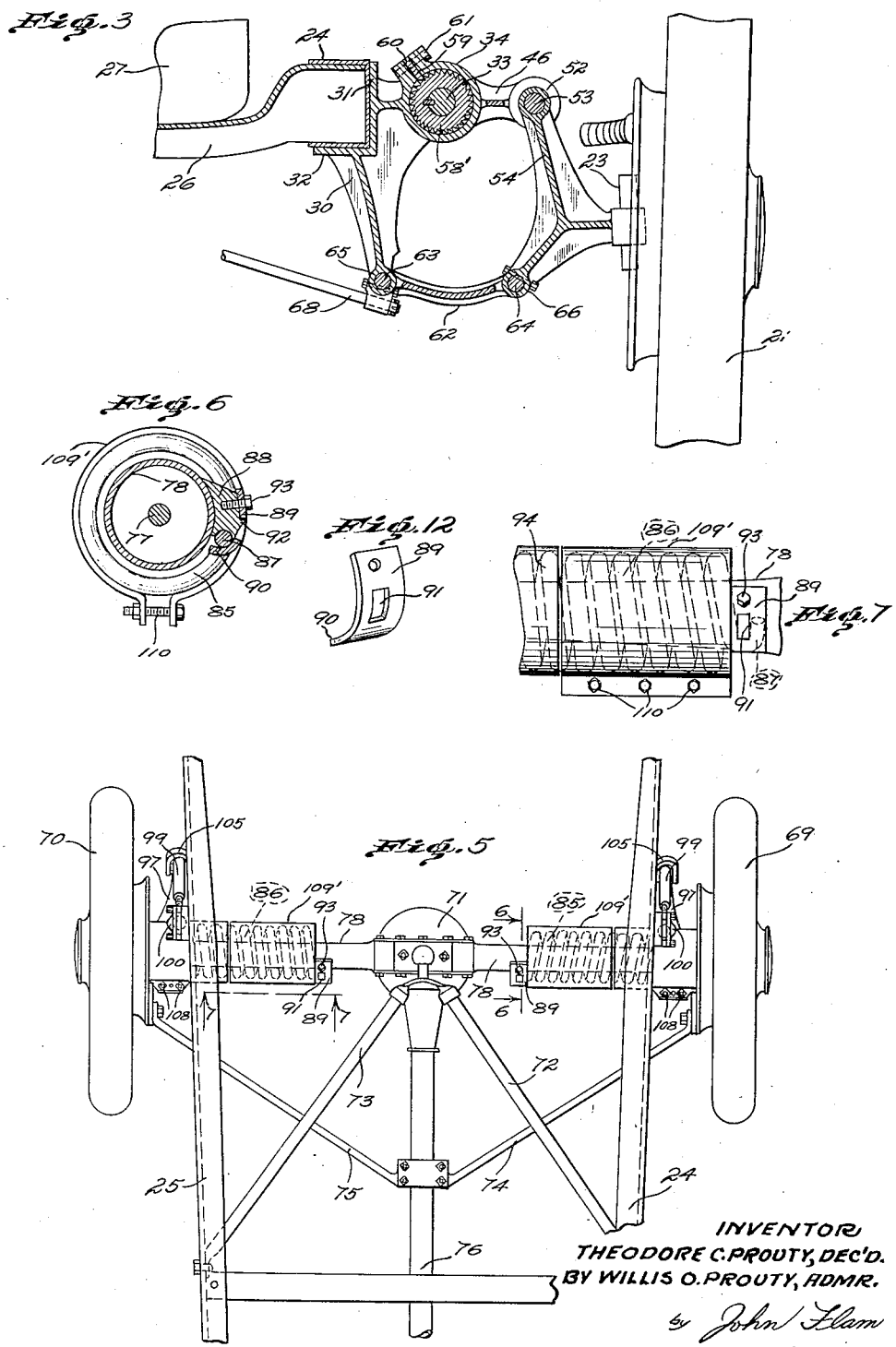

INVENTOR
THEODORE C. PROUTY, DEC'D.
BY WILLIS O. PROUTY, ADMR.
by John Flam
Attorney Patented Mar. 9, 1937

2,073,267

UNITED STATES PATENT OFFICE 2,073,267

VEHICLE SPRING SUSPENSION DEVICE

Theodore C. Prouty, deceased, late of Hermosa Beach, Calif., by Willis O. Prouty, administrator, Hermosa Beach, Calif., assignor, by mesne assignments to Metlox Corporation, Ltd., Manhattan Beach, Calif., a corporation of California Application October 26, 1931, Serial No. 571,157
Renewed June 23, 1936

5 Claims. (Cl. 267—20)

This invention relates to a spring suspension for a vehicle, and more particularly to a coiled spring device for supporting either the front or rear portions of the vehicle body.

In a prior application, Serial No. 541,372, filed June 1, 1931, and entitled Variable torque device, there is described several forms of such a suspension device, in which the easy riding qualities are described. In that application, care was taken to provide a spring structure that increases its resistance to flexure out of proportion to the extent of relative movement between the wheels and the vehicle body. In this way, undesired sustained oscillations of the vehicle were prevented, while the easy riding qualities due to the use of long coiled springs are secured.

It is an object of the invention to provide different modes of use of such springs with all the advantages secured by the forms shown in said prior application.

In applying such spring structures between the front wheels and the body of the vehicle, care must be taken to permit steering by the aid of the front wheels. In the present invention, this result is accomplished by so arranging matters that the steering is rendered easy, and even while the vehicle is making sharp turns, there is no tendency for the wheels to slip with respect to the road. This is accomplished by insuring that the width of tread of the vehicle stays constant over a substantial range of spring deflection.

It is still another object of the invention to provide against rebound by checking the action of the spring in a simple and effective manner.

The invention possesses many other advantages, and has other objects which may be made more easily apparent from a consideration of several embodiments of the invention. For this purpose there is shown a few forms in the drawings accompanying and forming part of the present specification, which illustrate the general principles of the invention; but it is to be understood that this detailed description is not to be taken in a limiting sense, since the scope of the invention is best defined by the appended claims.

Referring to the drawings:

Figure 1 is a front view of a vehicle body incorporating the invention;

Fig. 2 is a sectional view, taken along plane 2—2 of Fig. 1;

Fig. 3 is a sectional view, taken along plane 3—3 of Fig. 2;

Fig. 4 is a sectional view, taken along plane 4—4 of Fig. 2;

Fig. 5 is a plan view of the rear portion of a vehicle chassis showing how the rear end is spring supported in accordance with the invention;

Fig. 6 is a sectional view, taken along plane 6—6 of Fig. 5;

Fig. 7 is a fragmentary elevation, taken from plane 7—7 of Fig. 5;

Fig. 8 is a fragmentary view, mainly in section, of the rear spring structure and its associated parts;

Fig. 9 is a sectional view, taken along plane 9—9 of Fig. 8;

Fig. 10 is a detail sectional view, taken along plane 10—10 of Fig. 9;

Fig. 11 is a detail section, taken along plane 11—11 of Fig. 8;

Fig. 12 is a perspective view of a retainer member used in connection with the apparatus.

Figure 13:
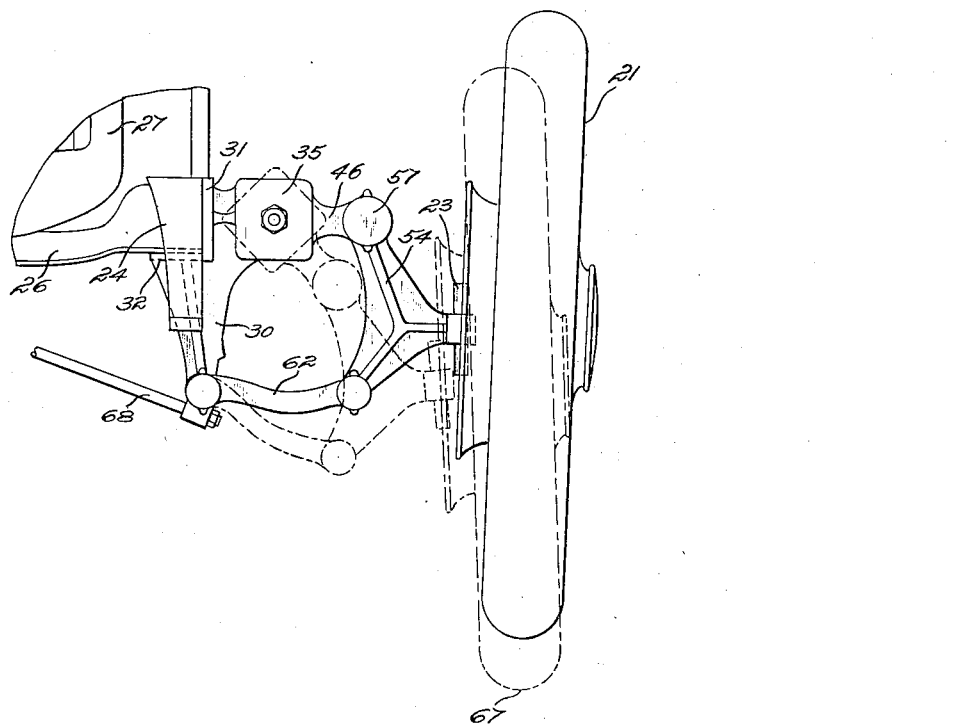
Fig. 13 is a diagram showing the action of the front wheel structure on relative movement of the body to the wheel structure, and illustrates how the tread width is maintained constant.

The manner in which the front spring structure is constructed is shown most clearly in Figs. 1, 2, 3 and 4. In these figures the front wheels are shown as rubber tired wheels 21 and 22, as are commonly used for automobiles. Each of these front wheels can be provided with the usual king pin 23 so that it can be turned by appropriate steering mechanism, not shown, to make a turn. The vehicle body is shown as including the longitudinally extending channels 24, 25, which may be joined transversely by several braces such as 26. The body proper 27 is supported on the chassis structure, which in turn is resiliently supported on the wheels 21, 22. This resilient support includes one or more stiff coiled springs associated with each wheel. As shown most clearly in Fig. 2, two such springs 28, 29 are indicated. The arrangement is such that as the vehicle body 27 moves downward toward the ground these two springs are coiled up and as the vehicle body 27 moves away from the ground these springs are permitted to unwind.

To accomplish this result, one end of each of the springs 28, 29 is anchored to the chassis structure and the other end is connected to the wheel structure, either directly or by intermediate elements. There will be now described in detail the spring suspension mechanism associated with one of the wheels 21, and it is of course understood that there is another similar spring suspension structure associated with the other wheel structure 22.

Thus there is a stationary bracket 30 having attaching plates 31, 32 fastening to the channel 24. This bracket supports a stationary shaft 33 by the aid of a hub 34 (Fig. 3). The shaft 33 can extend for a considerable distance in each direction from the hub 34, and the axis of the shaft can be substantially parallel with the longitudinal axis of the vehicle. The two springs 28, 29 surround these two extending portions of the shaft 33 as shown most clearly in Fig. 2. The outer end of each of these springs is anchored to the shaft 33 in a manner now to be described.

Keyed to each end of the shaft 33 is an anchor block 35 or 36. This anchor block has a hub portion 37 rigidly fastened to the shaft 33 as by a key 38. Spaced from the hub portion is an overlying flange 39. The end of the coiled spring 29 is shown as extending between the flange 39 and the hub 37, and its extremity 40 (Fig. 4) is bent to enter a groove 41 in the inner face of the flange 39. In order to hold the anchor block 35 on shaft 33 use can be made of a threaded extension 42 extending through the end wall of the block, and a crown nut 43. The other spring 28 is similarly anchored in the anchor block 36. The inner ends of the two springs 28, 29 are disposed on opposite sides of the hub 34 but are anchored in hubs 44, 45 which are free to rotate on shaft 33. These hubs 44, 45 are shown as integrally connected to a short link 46, which in turn is pivotally connected to the wheel structure in a manner to be hereinafter described. This link can extend in any desired direction; but in this case it is shown as extending transversely of the longitudinal axis of the vehicle.

Each of the hubs 44, 45 has an exterior flange such as 46' which has an internal groove for accommodating and anchoring the inner end of the associated spring 28 or 29. In order to provide rotation of link 46 with respect to shaft 33 use is made of ball bearings 47. These ball bearings are accommodated between an inner race 48 fastened to shaft 33; and an outer race 49 fastened in a recess in the hub 44 or 45. These hubs, as shown most clearly in Fig. 2, straddle the stationary hub 34 of bracket 30. The direction of winding of springs 28, 29, furthermore, is such that a counter-clockwise rotation of link 46, as viewed in Fig. 3, will wind up the springs. This counterclockwise movement occurs when the body of the vehicle moves toward the wheel structure.

The other end of the link 46 has a pair of hubs 51 and 52 that embrace a stationary stub shaft 53 held in a bracket 54. In Fig. 2 the bearing between hubs 51, 52, and shaft 53 is shown as provided with suitable ball bearings 55, located in suitable recesses in the hubs 51, 52. Appropriate covers 56, 57 can be fastened over these recesses to render the ball bearings dust proof.

Bracket 54 provides the bearing for king pin 23. It therefore forms a part of the wheel structure, in relation to which the vehicle body can move due to the interposition of springs 28, 29. Downward movement of the vehicle with respect to the wheel structure will therefore cause the springs to be wound up.

It is apparent that link 46 can be considered as a supporting member for the vehicle body which can vary its position in accordance with the weight imposed on the body, since the link 46 forms an extension that is strongly urged in a clockwise direction by springs 28, 29, whereby the load imposed on the vehicle is resiliently supported by the aid of the springs and this link 46.

In order to make it possible to adjust the tension of springs 28 and 29 and thereby to adjust its resisting torque, the attachment of the shaft 33 in the stationary hub 34 is made adjustable. For this purpose the shaft 33 is keyed to a ratchet wheel 58' (Fig. 3) which can be angularly adjusted in hub 34. This hub is split as indicated at 59 and in the split is a key or pawl 60. This pawl 60 engages in one of the teeth of wheel 58 so as to hold this wheel 58 against rotation after its angular position has been once adjusted. The pawl 60 has a slot through which the bolt 61 passes. This bolt also serves to compress the hub 34 around the wheel 58 when it is tightened. To adjust the tension of the spring, therefore, the front of the vehicle is lifted off the ground and the wheel structure is supported on link 46 so that there is no substantial force exerted on the springs 28 and 29. The bolt 61 is loosened and pawl 60 lifted out of engaging position. Then a wrench is applied to either one of the square anchor blocks 35 to turn the shaft 33 in a clockwise direction to any desired extent. The pawl 60 drops into place holding the wheel 58 in adjusted position, and then the bolt 61 is tightened.

It is apparent that if no further precautions be taken the wheel 21 may be caused to slide transversely of the road as the load imposed on the springs is varied, as occasioned by the movement of the vehicle over rough ground. In order to insure against this sliding or slipping matters are arranged in such a way that the part of the wheel 21 which contacts with the road 50 stays always in the same vertical plane, and the width of tread is kept constant. This is accomplished by the aid of a supplemental guide link 62 which is longer than link 46 and which extends below this link. It is pivotally joined between brackets 30 and 54 at their ends. For this purpose stub shafts 63 and 64 are fastened into hubs 65 and 66 formed integrally respectively with the brackets 30 and 54. The proportioning and spacing of links 46 and 62 are carefully determined to insure proper relative movement of the brackets 30 and 54.

Referring to Fig. 13, the movement of the wheel 21 with respect to the vehicle body 27 is indicated diagrammatically and shows that the lowermost point 67 of the wheel stays substantially in a vertical line as the linkages 46 and 62 operate. This diagram indicates how wheel 21 behaves when it drops down to reach a depression in the road. It always drops so as to keep the width of tread of the vehicle constant, whereby steering is rendered easy and whereby side slippage of the tires on the road is eliminated. In this way, the tread of the tires 21, 22 has an increased useful life.

The full line position of wheel 21 in Fig. 13 corresponds substantially to an average clearance of the vehicle body 27 over the road. The dot and dash position of Fig. 13 indicates a downward movement of the wheel structure toward a depressed portion of the road where the vehicle clearance is greater. Due to the links 46 and 62 the point of contact 67 of wheel 21 is vertically in line with the former point of contact in the full line position. However, the angle of the plane of the wheel varies slightly. This variation is inconsequential.

It is apparent that this action is brought about by the fact that the king pin 23, supports the wheel 21 intermediate the points of connection of the links 46 and 62 to the bracket 54. Thus as link 46 moves downward to the dot and dash position, its tendency is to push the center of the wheel outwardly. The corresponding movement of link 62, however, between these two positions tends to pull the wheel inwardly. By proper choice of these links these two opposing movements are such that the net result is merely a tilting of the wheel 21 without altering the width of tread of the vehicle. The link 62 must be longer than link 46 to accomplish this result; the specific dimensions being dependent on the other dimensions of the structure. The length of one link having been selected, the length of the other may be determined by geometrical lay-out.

In order to lend sufficient rigidity to the structure, there is indicated in Figs. 1 and 3 stay rods 68 extending between the lower ends of brackets 30 and the center portion of the chassis structure.

The operation of the front spring suspension is apparent from the foregoing. In normal riding the parts assume the position of Fig. 3, the link 46 being substantially horizontal. As the link 46 moves in a counterclockwise direction to wind up the springs 28 and 29 in response to a downward movement of vehicle body 27 the springs become more and more effective, not only because they are wound up tightly but also because they act through a shorter leverage on bracket 54. Accordingly, the stiffness of the resilient support increases out of proportion to the extent of relative movement of the vehicle body 27 with respect to the wheel 21.

Referring now to Figs. 5 to 12 inclusive, the rear spring suspension also produces this greatly increased resistance as the load is imposed. In these figures there is indicated the conventional rear wheels 69, 70, and the banjo housing 71 for encasing the drive shafts for these wheels. As shown most clearly in Fig. 5, this banjo housing is provided with stay rods 72, 73. Similar stay rods 74 and 75 are used for the wheel structures. It is, of course, to be understood that a propeller shaft extends through a housing 76 to operate the conventional differential mechanism for rotating the wheels 69, 70.

In Fig. 8 there is shown the shaft 77 which provides power for the wheel 69. It is enclosed in the extension 78 of housing 71 and can be packed with grease. This extension 78 carries a bushing 79 which in turn carries a ball bearing support 80. This ball bearing support supports the outer race 81 of conventional ball bearings, the inner race being fastened on a shoulder of shaft 79, as by nuts 82. In order to prevent the grease in the housing from flowing axially toward the wheel 69 use can be made of a felt packing washer 83 held in a ring 84 disposed on a shoulder of sleeve 79.

Since the rest of the wheel structure elements are conventional, they are more or less diagrammatically shown in Fig. 8.

In the present instance the resilient support between the chassis channels 24, 25 and the housing and wheel structures is provided by a pair of springs 85 and 86. These springs are respectively coiled around extensions 78. One end, such as the inner end, is anchored to the housing 78 in a manner most clearly indicated in Figs. 6, 7 and 12.

Thus the inner end turn of each of the springs 85, 86 is formed into a hook 87 that engages an anchor block 88 rigidly attached to the extension 78 as by welding. This block 88 has a concave hook in which the spring end 87 is seated as clearly indicated in Fig. 6. To ensure against accidental removal of part 87 from the anchor 88 a retainer plate 89 may be used that has a curved end 90 engaging the part 87. This retainer plate has a slot 91 against the upper edge of which a shoulder 92 of anchor block 88 contacts, in order to position the retainer plate accurately. A bolt 93 holds the retainer plate securely to the anchor block.

The other end of each of the springs 85, 86 is anchored to the inside of a sleeve 94, as by the aid of a hook 95 formed on the inner periphery of this sleeve. This hook is shown most clearly in Fig. 11. This sleeve 94 in turn is fastened into a hub 96 of a lever 97. Roller bearings 98 are interposed between sleeve 94 and sleeve 79, to permit relative rotation between lever 97 and the housing 78. It is thus apparent that by rotation of lever 97 in a clockwise direction as viewed in Fig. 9 the spring 85 will be wound up. The clockwise movement of lever 97 occurs when the chassis of the vehicle moves downward with respect to the wheel 69. This can be provided, for example, by a connecting structure such as connecting rod 99. This member 99 has a universal coupling with the end of lever 97 as shown in detail in Fig. 10. It also has a universal pivot 100 on the side of the channel 24. Its length can be adjusted as by providing a screw threaded portion 101 which engages the main rod 99 and which carries the ball and socket connection for the universal joint 100.

The ball and socket or universal connection, between the member 99 and lever 97 is arranged by having a spherically concave recess 102 in the end of the lever 97. In this recess is accommodated member 103 of spherical conformation fastened to a stub shaft 104 supported in the clevis 105 of the member 99.

Due to the use of the universal joints at both ends of the member 99, side movement of the chassis is permitted to a limited extent. The point of connection of the member 99 to channel 24 is such as to be almost vertically above the axis of shaft 77. It is due to this arrangement that the resistance of the spring 85 increases out of proportion to its flexure, since the effective radius of the force imposed upon the spring as the chassis moves downwardly is reduced. This is due to the fact that the longitudinal axis of member 99, which is the direction of the force application, approaches closer and closer to the axis of the shaft 77 as this collapsing movement between the chassis structure and the wheel structure takes place.

There is also provided a means for adjusting the tension of each of the springs 85 and 86. For this purpose sleeve 94 has a series of peripheral slots 106. A key 107 extends through a split in the hub 96 and holds the sleeve 94 in any adjusted position when in engagement with one of the slots 106. Bolts 108 extend through the split and through slots 109 of the key 107 for maintaining the key in engaging position. When it is desired to adjust the spring tension, the rear end of the vehicle is raised, bolts 108 are loosened, key 107 is moved outwardly to the extent permitted by slots 109 and the position of lever 97 is adjusted with respect to the sleeve to any desired extent. After the adjustment the key 107 is reinserted into one of the slots 106 and bolts 108 are tightened.

It is apparent that after hitting a bump on the road there is a rebound which tends to uncoil the springs 85 and 86. In order to check this rebound there may be provided a device for limiting the expansion of at least some of the coils of the springs. This expansion occurs in response to the release of the load on the spring and can be made to provide a snubber action. Thus, over a portion of each of the springs 85, 86 there is provided a tube or band 109' having an adjustable diameter, as by the aid of bolts 110 (Figs. 6 and 7). The diameter of this band is so adjusted that upon a definite expansion of the coils encompassed by the band these coils come in contact with the inner wall of the band and are prevented from being further expanded. In the present instance there is shown substantially all of the turns surrounded by the band, but it may be advisable in some instances to restrict this snubber action to a smaller portion of the spring. The band 109' can be prevented from axial movement in any appropriate manner; as, for example, by the anchor block arrangement 88 on the one side, and the sleeve 94 on the other side.

What is claimed is:

1. In a vehicle spring suspension device between the chassis of a vehicle and a wheel structure thereof, an attachment plate for attaching the suspension device to the chassis, pivoted means extending laterally of the longitudinal axis of the vehicle for connecting the chassis to the structure, and a spring coiled around the axis of said pivoted means, one end being anchored to the attachment plate, and the other to the pivoted means.

2. In a vehicle spring suspension device between a wheel structure and a vehicle chassis, a shaft rigidly fastened at an intermediate portion to the chassis and extending longitudinally thereof, a pair of springs disposed over the shaft and anchored respectively to opposite ends of the shaft, and means for suspending the wheel structure and fastened to both of the springs adjacent those ends of the springs which are nearest together.

3. In a vehicle spring suspension device between a wheel structure and a vehicle chassis, a shaft rigidly fastened at an intermediate portion to the chassis and extending longitudinally thereof, a pair of springs disposed over the shaft and anchored respectively to opposite ends of the shaft, means rotatable about the axis of the shaft, for suspending the wheel structure, and attached to the free ends of the springs.

4. In a vehicle spring suspension device between a wheel structure and a vehicle chassis, means forming a hub rigidly attached to the chassis, means extending through the hub and fixed against relative rotation therein, a pair of springs respectively on opposite sides of the hub, the outer ends of the springs being attached respectively to the ends of the means that extend through the hub, and means for suspending the wheel structure and pivotally mounted on the axis of the hub and attached to the inner ends of the springs.

5. In a vehicle spring suspension device between a wheel structure and a vehicle chassis, means forming a hub rigidly attached to the chassis, means extending through the hub and fixed against relative rotation therein, a pair of springs respectively on opposite sides of the hub, the outer ends of the springs being attached respectively to the ends of the means that extend through the hub, and means for suspending the wheel structure, comprising a link pivotally mounted on the axis of the hub, and anchored to the inner ends of the springs, and a longer link pivotally mounted at one end to the chassis and at the other end to the wheel structure.

THEODORE C. PROUTY,
*Deceased,*
By WILLIS O. PROUTY,
*Administrator.*